April 26, 1932.   J. S. STULL   1,855,930
APPARATUS FOR FORMING ARTICLES
Filed Aug. 3, 1929   5 Sheets-Sheet 1
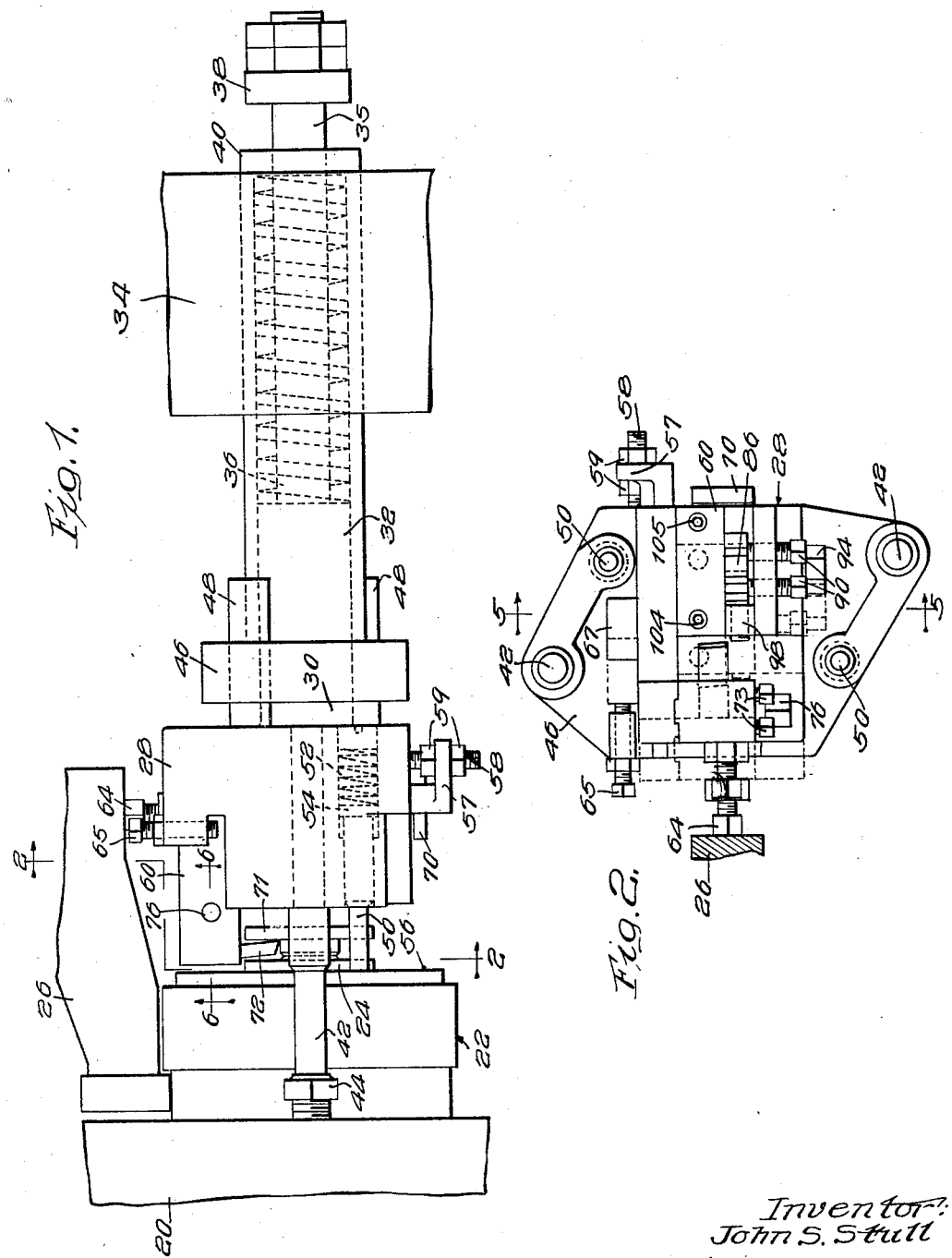
Inventor:
John S. Stull
By H. A. Patterson
Atty April 26, 1932. J. S. STULL 1,855,930
APPARATUS FOR FORMING ARTICLES
Filed Aug. 3, 1929    5 Sheets-Sheet 2

Inventor
John S. Stull
By
H. A. Patterson
Atty

April 26, 1932.     J. S. STULL     1,855,930
APPARATUS FOR FORMING ARTICLES
Filed Aug. 3, 1929     5 Sheets-Sheet 3

Inventor
John S. Stull
By H. A. Pattison
Atty

April 26, 1932. J. S. STULL 1,855,930
APPARATUS FOR FORMING ARTICLES
Filed Aug. 3, 1929 5 Sheets-Sheet 4

Inventor
John S. Stull
By

April 26, 1932.   J. S. STULL   1,855,930
APPARATUS FOR FORMING ARTICLES
Filed Aug. 3, 1929   5 Sheets-Sheet 5

Inventor:
John S. Stull

Patented Apr. 26, 1932

1,855,930

UNITED STATES PATENT OFFICE

JOHN S. STULL, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR FORMING ARTICLES

Application filed August 3, 1929. Serial No. 383,384.

This invention relates to apparatus for forming articles, and more particularly to fixtures for automatic machines designed to produce piece parts.

The invention is particularly applicable to the manufacture of piece parts on automatic screw machines wherein successive forming operations are performed on a blank or bar of stock to produce piece parts of predetermined shape and dimensions.

An object of the invention is to provide an apparatus for forming articles rapidly and accurately and requiring a minimum of attention on the part of the operator.

In one embodiment of the invention, a bar of stock is constantly rotated about its longitudinal axis and has at one end a partly formd piece part having oppositely disposed surfaces perpendicular to the longitudinal axis of the bar. A facing fixture is arranged in substantial alignment with the bar and is movable longitudinally toward and away from the bar. Within the fixture is mounted a transversely movable slide which carries two spaced cutting tools adapted to operate respectively on the oppositely disposed surfaces of the piece part. By suitably synchronized actuating means, the fixture is moved toward the piece part until the cutting tools are in alignment with the respective surfaces of the piece part, whereupon the slide is actuated to move the tools transversely to cause them to machine the surfaces, the tools being so spaced from each other that one of them operates progressively from the center of the part outwardly, while the other simultaneously operates from the periphery of the part inwardly toward the center. By this arrangement both surfaces of the part may be finished in one operation, and where the invention is used in conjunction with known automatic machines, no part of the process requires the intervention of the operator. Provision is also made so that the tools may be independently adjusted and end play of the spindle is eliminated.

The invention will be more fully understood from the following description taken in connection with the appended drawings, in which Fig. 1 is a fragmentary plan view illustrating the invention as applied to an automatic machine, and showing the parts in their operative positions;

Fig. 2 is a sectional view taken on line 2—2 of Fig. 1;

Fig. 8 is a fragmentary plan view of a modified form of apparatus, showing in section the piece being operated on;

Figure 3:
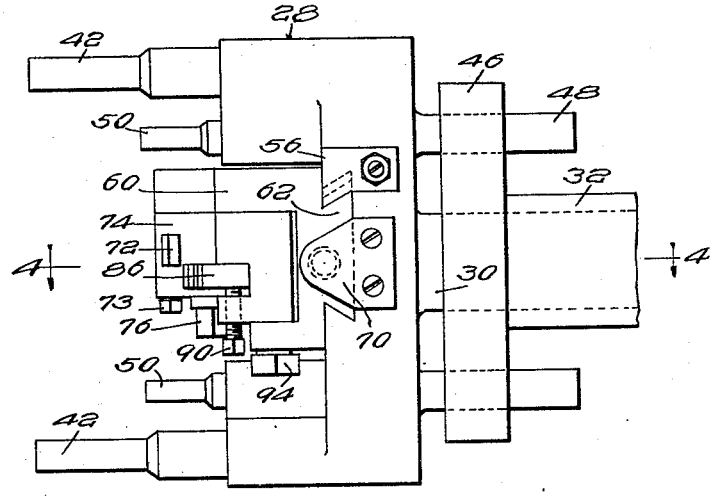
Fig. 3 is a side elevation of the facing fixture and the slide carried thereby.

Referring more particularly to the drawings, the fixture illustrated in Figs. 1 to 7, inclusive, is designed to be applied to an automatic screw machine of the type wherein a plurality of tools are positioned at spaced stations, and an equal number of bars of stock material are held in spindles which are rotatably mounted in a spindle head, which is intermittently rotated to index the bars successively into juxtaposition with each of the stations. The tools are mounted on a common tool slide which is designed to be advanced periodically to bring the tools into operative positions relative to the bars of stock, and the bars are constantly rotated about their respective axes by the spindles to cause the various tools carried by the tool slide to perform work on the ends of the bars.

Suitable actuating means of known construction are mounted adjacent the spindle head and are moved transversely in timed relation to the advance of the tool slide to actuate tool-carrying slides carried thereby.

As will be seen in Fig. 1, the automatic machine comprises a rotatable spindle head 20 which carries a plurality of spindles which terminate in chucks 22, only one of which is shown in the drawings, since all are identical in construction. The spindles are positioned at spaced points around the periphery of the spindle head 20 and are designed to receive the several bars of stock 24. The spindles are rotated about their respective axes by suitable known driving means (not shown), the bars being periodically advanced longitudinally of the spindles by suitable advancing means, which form a part of the known automatic machines and are not shown in the drawings. Disposed laterally with respect to the chuck 22 is a transversely movable actuating slide 26 which is periodically moved by suitable known means (not shown) in timed relation to the movement of the tool slide for a purpose to be described below.

The facing fixture 28 is mounted at the end of a supporting rod 30 which is slidable within a hollow sleeve 32. The sleeve 32 is fixedly mounted in a tool slide 34, which is periodically actuated, by means not shown, to cause it to move toward and away from the chuck 22. The rear portion 35 of rod 30 is formed of smaller diameter than the remainder of the rod to provide space for a strong coiled compression spring 36 which urges the rod 30 forwardly. The forward movement of rod 30 relative to slide 34 is limited by an adjustable stop 38 which coacts with a constricted end 40 formed on the sleeve 32.

The fixture 28 carries a pair of forwardly extending stop pins 42 fixed thereto, the forward ends of the stop pins being designed to seat against bosses formed upon the heads of corresponding stop screws 44. It will thus be seen that the limit of the forward movement of the facing fixture is fixed by the position of stop screws 44, and that after the pins 42 contact with the stop screws the further movement of sleeve 32 results only in compressing the spring 36, causing end 40 to move away from stop 38 without changing the position of the fixture 28. In order to maintain an accurate alignment between sleeve 32 and the facing fixture during this movement the sleeve is provided at its forward end with an apertured collar 46, and a pair of studs 48 are fixed in the fixture and project rearwardly therefrom through the apertures in collar 46.

A pair of pins 50 are mounted in bores formed in the fixture 28 and are urged forwardly by compression springs 52 seated therein, their forward movement being limited by flanges 54 formed on the pins. The forward ends of pins 50 are designed to contact with a plane surface formed by an idle or stationary disc 56 formed on the chuck 22 to steady the fixture during the operation thereof and prevent relative vibration between the fixture and the chuck. By this means end play of the spindle terminating in the chuck 22 is practically eliminated during the advance of the fixture.

A tool holding slide 60 (Fig. 4) is mounted in the facing fixture 28 for transverse movement and is held in position by a dovetailed flange 62 which is slidable in a correspondingly shaped groove in the fixture, a tapered feather 63 being adjustably positioned in the groove to form a close sliding fit between the flange 62 and the groove. The larger end of the feather 63 is provided with a lateral flange 57 which fits slidably over a screw 58 set in the fixture 28. A pair of adjusting nuts 59 are mounted on the screw 58 to hold the flange 57 and feather 63 in their adjusted positions. A driving screw 64 is adjustably seated in flange 62 and is designed to contact with the actuating slide 26 to move the slide 60 to the position shown in Figs. 1 and 4. The tool holding slide 60 is yieldingly urged in the reverse direction by a coiled spring 66 seated in a cylindrical bore formed in flange 62 and having one of its ends contacting with a stud 68 which projects into the bore of the flange 62 and is held in position by a bracket 70. Upon retraction of the actuating slide 26 in the operation of the machine, the spring 66 moves the tool holding slide 60 to the left as viewed in Fig. 2, such movement being limited by a stop screw 65 mounted on the fixture 28 and coacting with a projection 67 formed on the slide 60.

The particular apparatus illustrated in this application is designed to finish the opposite faces of a telephone transmitter electrode 71 (Fig. 7) after it has been partially formed from the bar 24 but not severed therefrom. It will be understood, however, that the illustrated embodiments may with appropriate changes be adapted to operate on a wide variety of piece parts other than that illustrated.

A facing tool 72, designed to finish an undercut surface such as the surface 75 of the part 71, is fixed by means of a set screw 73 (Fig. 6) in a block 74. The block 74 is adjustably mounted on the slide 60 by means of a clamping bolt 76 which passes through an elongated slot 78 in block 74 and is threaded into the slide 60 to permit the tool 72 to be adjusted longitudinally of the bar 24. Such adjustment is accomplished by means of an adjusting screw 80 threaded into flange 62 and having a grooved head 82 engaging a retaining pin 83 in block 74. The adjusting screw is designed to be rotated either by a screwdriver or by means of a pin inserted in diametrically positioned holes 84 formed in the screw, the bolt 76 being loosened before adjusting and tightened after the adjustment has been made.

Figure 4:
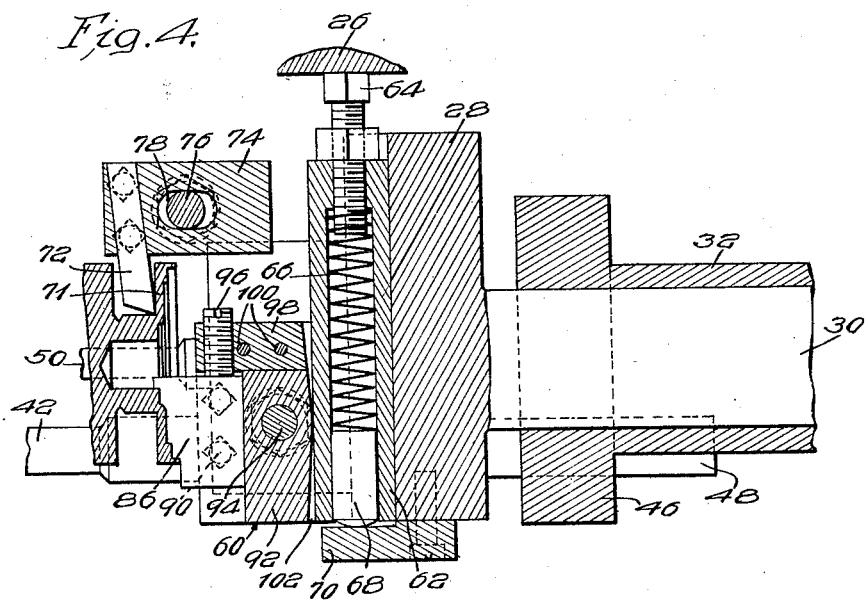
Fig. 4 is an enlarged sectional view taken on line 4—4 of Fig. 3.
Figure 5:
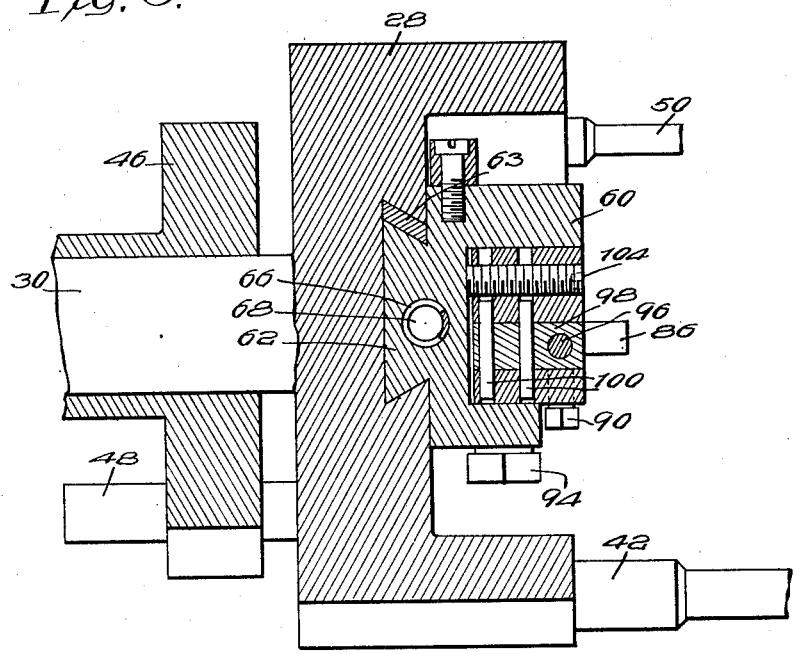
Fig. 5 is an enlarged sectional view taken on the line 5—5 of Fig. 2.
Figure 6:
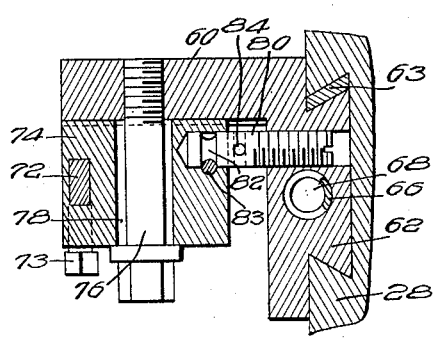
Fig. 6 is an enlarged sectional detail view taken on line 6—6 of Fig. 1.

A second facing tool 86 (Fig. 4), which may be irregularly formed to correspond with the irregular surface 88 of part 71, is fixed by means of set screws 90 in a block 92 which is adjustably mounted on the slide 60 by means of a clamping bolt 94 which passes through the block 92 and the slide 60. Lateral adjustment of the tool 86 is accomplished by means of an adjusting screw 96 threaded into a flange 98 which is fixed to block 92 by means of pins 100. The rear surfaces 102 of the block 92 and flange 98 are convexly curved as shown in Fig. 4 to permit the block and flange to be rocked or rotated about bolt 94 as a pivot to secure the proper alignment between the tool 86 and the work, the tool being held in its adjusted position by means of a pair of adjusting screws 104—105 which pass through the upper portion of the block 92 and seat against the slide 60. It will thus be seen that the tools 72 and 86 are individually adjustable independently of the tool slide 34.

Figure 7:
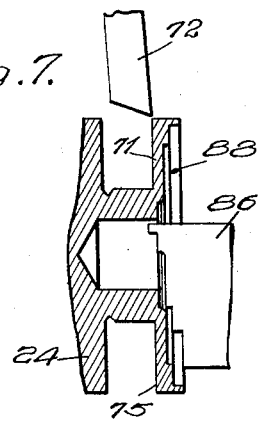
Fig. 7 is an enlarged sectional view of a piece part formed in accordance with the invention and showing the relation of the tools to the work just previous to their being moved to operating position.

In the operation of the embodiment above described, a plurality of bars 24 are inserted in the work holding spindles of the spindle head 20. The bars are then indexed with respect to an equal number of stations, where a plurality of operations are performed on them. When one of the bars 24 is shaped into the form shown at 71 in Fig. 7, it is indexed into juxtaposition with the facing fixture 28, the mechanism of which has been described above. The bar 24 being properly indexed, the tool slide 34 and sleeve 32 are moved forwardly through a predetermined distance by means not shown but forming a part of the known automatic machines. As the sleeve 32 moves forward, the fixture 28 is also moved forward by the action of spring 36 until stop pins 42 contact with stop screws 44 to arrest its further movement, whereupon spring 36 is progressively compressed and sleeve 32 slides along the supporting rod 30 until the sleeve has reached the forward limit of its movement. Meanwhile pins 50 have engaged the stationary surface 56 to steady the fixture 28 relative to the chuck 22. The tools 72 and 86 are thus accurately aligned with surfaces 75 and 88 due to the action of stop screws 44 but, as shown in Fig. 7, are disposed laterally of their operating positions. The tools are then simultaneously moved through their cutting stroke by the actuating slide 26 which moves to the right as viewed in Fig. 2 to impart a corresponding movement to the tool holding slide 60 and the tools carried thereby.

When tools 72 and 86 have completed their cutting stroke, slide 26 is retracted by means not shown, and the tools are moved by spring 66 from the position shown in Fig. 4 to the position shown in Fig. 7. The slide 34 and sleeve 32 are then moved to the right as viewed in Fig. 1, and the spindle head 20 indexed to bring the bar 24 into registry with another tool (not shown) which severs the completed part from the bar.

The embodiment shown in Figs. 8 to 12 is designed to be applied to an automatic screw machine of the type wherein a plurality of tools are mounted on a turret for rotation in a vertical plane, to be successively indexed into operative relation with a spindle which is mounted for rotation about a fixed axis.

Referring more particularly to Figs. 8 to 12, the reference numeral 108 designates the turret, which is disposed in a vertical plane and is rotatable about a horizontal axis perpendicular to the axis of the bar of stock 24. The bar 24 is fixedly mounted in a rotary spindle which may be of the same construction as the spindle described in connection with Figs. 1 to 7. Disposed laterally with respect to the spindle is a transversely movable actuating slide 126 which is periodically moved by suitable known means (not shown) in timed relation to the movement of the turret for a purpose to be described below.

The facing fixture 110 comprises a flange 112 which is adjustably secured against the surface of turret 108 by means of bolts 114 having their heads engaging in a T-slot 116 formed in the turret and extending radially thereof. Nuts 118 on the bolts may be loosened to adjust the fixture 110 radially of the turret.

A tool holding slide 120 is mounted in the fixture 110 for transverse movement and is held in position by a dove-tailed flange 122 which is slidable in a correspondingly shaped groove in the fixture. A driving screw 124 is adjustably seated in flange 122 and is designed to contact with a transversely movable actuating slide 126 which moves the slide 120 into the position shown in Figs. 8, 10, and 11. The slide 120 is yieldingly urged in the reverse direction by a coiled spring 128 seated in a cylindrical bore formed in flange 122 and having one of its ends contacting with a stud 130 projecting into the bore of the flange 122 and held in place by a bracket 132. Upon retraction of the actuating slide 126 in the operation of the machine, the spring 128 moves the tool holding slide 120 to the right as viewed in Fig. 10, such movement being limited by a stop screw 131 mounted on the fixture 110 and coacting with a pin 133 fixed to the slide 120.

A facing tool 134, similar to tool 72 shown in Figs. 1 to 7, is fixed by means of set screws 135 in a block 136. The block 136 is adjustably mounted on the slide 120 by means of a clamping bolt 138 passing through an elongated slot 140 in block 136 and threaded into the slide 120 to permit the tool 134 to be adjusted longitudinally of the bar 24. Such adjustment is accomplished by means of an adjusting screw 142 threaded into flange 122 and having a grooved head 143 engaging a retaining pin 145 in block 136. The adjusting screw 142 is provided with diametric holes 144 and is designed to be operated in the same manner as adjusting screw 96, above described.

Figure 11:
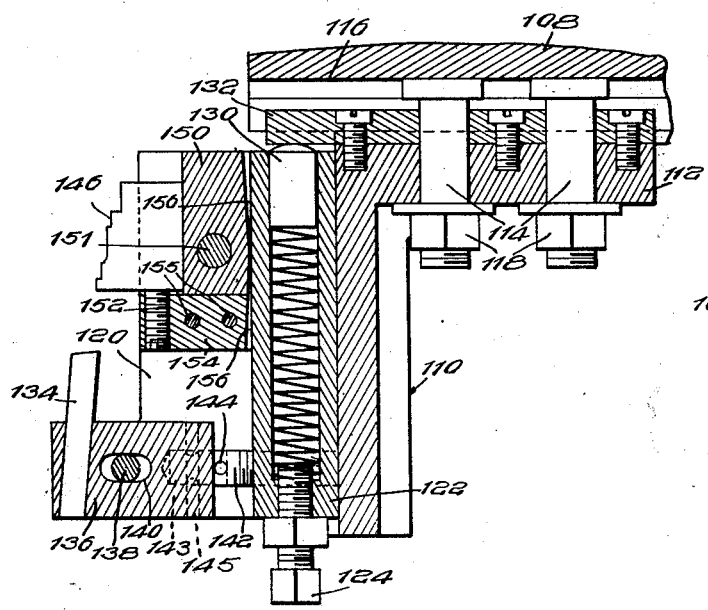
Fig. 11 is a sectional view taken on the line 11—11 of Fig. 9.
Figure 12:
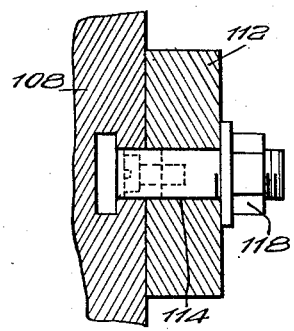
Fig. 12 is a sectional detail view taken on the line 12—12 of Fig. 9.

A second facing tool 146, similar to tool 86, described in connection with Figs. 1 to 7, is fixed by means of set screws 148 in a block 150 which is adjustably mounted on the slide 120 by means of a clamping bolt 151 which passes through the block 150 and the slide 120. Lateral adjustment of the tool 146 is accomplished by means of an adjusting screw 152 threaded into a flange 154 which is fixed to block 150 by means of pins 155. The rear surfaces 156 of the block 150 and flange 154 are convexly curved as shown in Fig. 11 to permit the block and flange to be rocked or rotated about bolt 151 as a pivot to secure the proper alignment between the tool 146 and the work, the tool being held in its adjusted position by adjusting screws 157—158, similar to screws 104—105 above described.

Figure 8:
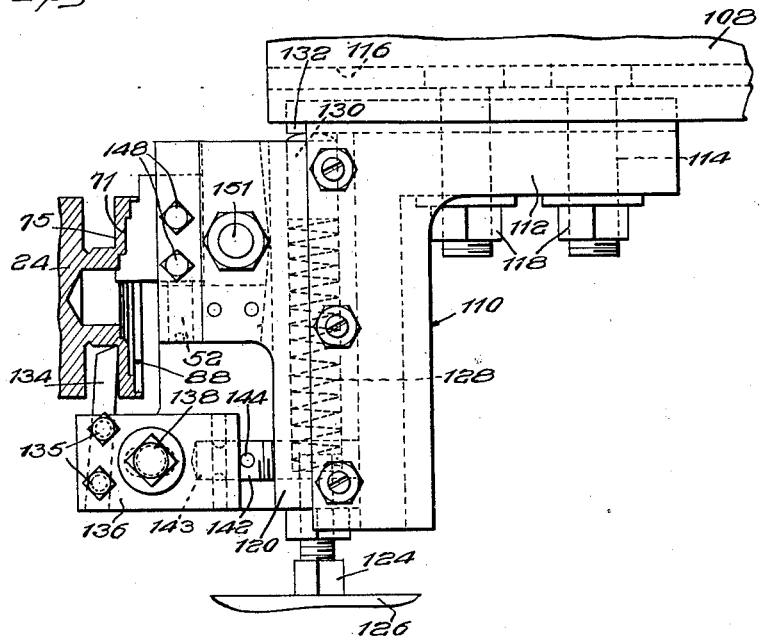
Figure 9:
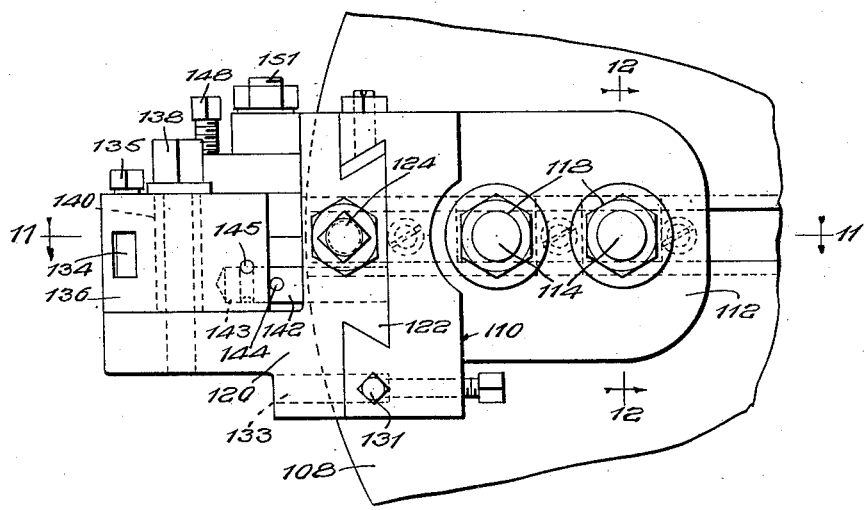
Fig. 9 is a side elevation of the apparatus shown in Fig. 8.
Figure 10:
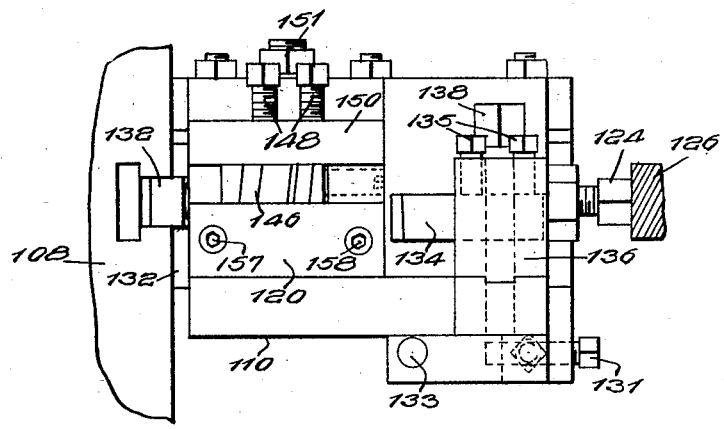
Fig. 10 is a front elevation of the apparatus shown in Fig. 8.

In the operation of the embodiment just described and shown in Figs. 8 to 12, a bar 24 is inserted in a rotating work holding spindle which is fixedly mounted in alignment with the turret 108. The various tools carried by the turret are then successively brought into operative relation with the bar 24 until the electrode 71 is formed as shown in Fig. 8. The fixture 110 is then indexed into operative relation with the electrode 71 and the turret is moved forwardly through a predetermined distance by means not shown but forming a part of the known automatic machines. The tools 134 and 146 are thus moved into alignment with surfaces 75 and 88 on the electrode, but are disposed laterally of their operating positions. The tools are then simultaneously moved through their cutting stroke by actuating slide 126 which moves to the left as viewed in Fig. 10 to impart a corresponding movement to the tool holding slide 120 and the tools carried thereby.

When the tools 134 and 146 have completed their cutting stroke, slide 126 is retracted by means not shown, and the tools are moved by spring 128 to their retracted position. The turret 108 is then moved to the right as viewed in Figs. 8, 9, and 11, and is indexed to bring another tool (not shown) into registry with the bar 24, which tool severs the completed electrode from the bar 24.

It will be understood that the embodiments above described are merely illustrative of the invention, which is limited only by the terms of the appended claims.

What is claimed is:
1. In a forming mechanism, a fixture comprising, a single transversely movable slide for carrying a tool-carrying block, a tool-carrying block carried by the slide and having a convex face bearing against the slide, means for holding the block against the slide, adjusting means for maintaining the block in a predetermined angular position relative to the slide, and a second tool-carrying block adjustably mounted on the same slide.

2. In a forming mechanism, an indexing spindle head, a rotatable chuck extending therefrom and adapted to hold the work, an idle disc mounted on the outer end of the chuck, a slide mounted opposite the outer end of the work, a tool-carrying fixture secured to the slide, a resilient member interposed between the tool-carrying fixture and the slide, means for actuating the slide to move the tool-carrying fixture toward and adjacent to the outer end of the work, a plurality of fixed pins secured at spaced points around the fixture for engaging projections extending from the indexing spindle head to limit said movement of the fixture toward the work and to maintain the fixture stable, a plurality of yieldable pins secured at spaced points around the fixture for engaging the idle disc on the chuck to take up end play of the chuck, and finishing tools mounted in the tool-carrying fixture for operating upon the work.

3. In a multiple-spindle turning machine, an indexing spindle head, a rotatable chuck protruding therefrom and adapted to grip one end of the work, a slide mounted opposite the free end of the work, a rod secured to the slide and extending axially of the work, said rod having an enlarged head portion adjacent the work, a cross-slide mounted in the head of the rod, a pair of finishing tools secured to the cross-slide for engaging opposite surfaces of the work, means for moving the cross-slide towards the work, and a spring interposed between the head of the rod and the cross-slide for retracting the cross-slide away from the work.

4. In a multiple-spindle turning machine, an indexing spindle head, a chuck protruding therefrom and adapted to grip one end of the work, a slide movable toward the free end of the work, a rod secured to the slide and extending toward the free end of the work, said rod having an enlarged head portion at its outer end and adjacent the free end of the work, a cross-slide mounted in the head of the rod, an idle disc mounted on the outer end of the chuck, a pair of spaced yieldable pins extending from the rod head to engage the disc and take up end play in the chuck, a pair of spaced fixed pins extending from the rod head to engage extensions from the indexing head to maintain the rod head stable, a pair of tools secured to the cross-slide for simultaneously finishing the free end and a reentrant surface of the work, and means for moving the cross-slide toward the work.

5. In a forming mechanism, relatively movable work and tool supporting members, a movable work holding member carried by said work supporting member, a tool carrier movable in the tool supporting member, a tool carried thereby, a yieldable abutment on the tool carrier engageable with the work supporting member for taking up end play of the work holder in the work supporting member, and cooperating abutments on the tool and work supporting members for thereafter limiting the relative movement thereof in one direction.

6. In a forming mechanism, relatively movable work and tool supporting members, a carrier movable in the tool supporting member, a tool holder movable in the carrier, and an element movable with respect to the tool holder for causing a relative movement between the tool holder and the carrier.

In witness whereof, I hereunto subscribe my name this 24th day of July A. D., 1929.

JOHN S. STULL.